United States Patent
Abouchaar

(12) 
(10) Patent No.: US 6,582,295 B1
(45) Date of Patent: Jun. 24, 2003

(54) METHOD OF DETECTING CLOGGING OF AN AIR FILTER AND VENTILATION SYSTEM EMPLOYING SUCH A METHOD

(75) Inventor: Nicolas Abouchaar, Bad Rodach (DE)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/605,863

(22) Filed: Jun. 29, 2000

(30) Foreign Application Priority Data

Jun. 30, 1999 (FR) .............................................. 99 08405

(51) Int. Cl.⁷ ................................................. B60H 3/06
(52) U.S. Cl. ........................ 454/158; 55/385.2; 340/607
(58) Field of Search .................. 454/75, 158; 55/385.2, 55/385.3; 340/607

(56) References Cited

U.S. PATENT DOCUMENTS 4,240,072 A    12/1980   Fowler

FOREIGN PATENT DOCUMENTS

| DE | 4037685 A1 | | 6/1992 | |
|----|-----------|---|--------|---|
| JP | 5-332590 | * | 12/1993 | |
| JP | 6-50596 A | * | 2/1994 | .................. 454/158 |
| JP | 10-309422 | * | 11/1998 | |

* cited by examiner

Primary Examiner—Harold Joyce
(74) Attorney, Agent, or Firm—Liniak, Berenato & White

(57) ABSTRACT

A method of measuring clogging of an air filter in a system for ventilation, air conditioning and/or heating of a passenger compartment of a motor vehicle, includes starting up an electric motor (11) driving a fan, measuring a characteristic value of the electric motor for driving the air passing through the filter (3) the clogging of which is being measured; comparing the measured value with a calibration value, to deduce therefrom a measure of the clogging of the filter.

20 Claims, 1 Drawing Sheet

METHOD OF DETECTING CLOGGING OF AN AIR FILTER AND VENTILATION SYSTEM EMPLOYING SUCH A METHOD

FIELD OF THE INVENTION

The present invention relates principally to a method of detecting clogging of an air filter and to a system for ventilation, heating and/or air conditioning of a motor vehicle employing such a method.

BACKGROUND OF THE INVENTION

It is usual to filter the air brought in by a system for ventilation, heating and/or air-conditioning of a passenger compartment of a motor vehicle by making the air pass through an air filter. Particles, especially dust particles, are retained by the air filter which finally becomes clogged, that is to say that it induces significant losses of pressure head reducing the throughput of air passing through the filter, and thus lowers the performance of the ventilation system. The clogging of the filter depends on the size and on the quantity of particles deposited on this filter. Hence, the rapidity of the clogging depends, in very large part, on the conditions of use and especially on the quantity of dust in the air at the time when the heating, ventilation and/or air conditioning system is used.

It is therefore desirable to be able to detect the state of clogging.

Consequently one object of the present invention is to offer a method of detecting filter clogging which is easy to implement.

It is also an object of the present invention to offer a method of detecting filter clogging avoiding false alarms.

It is also an object of the present invention to offer a method of detecting filter clogging employing few special-purpose electronic components.

It is also an object of the present invention to offer a reliable method of detecting filter clogging.

SUMMARY OF THE INVENTION

According to a first aspect of the present invention there is provided a method of measuring clogging of an air filter of a system for ventilation, air conditioning, and/or heating of a passenger compartment of a motor vehicle, the method comprising:

a) starting up an air-pumping device including an electric motor driving an air-driving rotating aerodynamic component;

b) measuring a characteristic value of the electric motor driving at least one rotating aerodynamic component for driving the air passing through the filter the clogging of which is being measured, in order to obtain a measurement value;

c) comparing the measurement value with at least one calibration value in order to deduce therefrom a measure of the clogging of the filter.

The method of the present invention may employ the measurement of the strength of the current drawn by an electric drive motor of the air-circulation blower in the system for ventilation, air-conditioning and/or heating of the passenger compartment of a motor vehicle. For example, during a first step, a calibration is carried out. This calibration may be a measurement taken with a new filter. In a case in which the recirculated air is not filtered, it is possible to carry out an acquisition of a calibration value, for example by acquisition of a calibration current $i_e$ of the electric motor corresponding advantageously to the ventilation of the passenger compartment of the vehicle by recirculation of the air taken in from this passenger compartment without filtering.

For a measured current i of less than the calibration current $i_e$ multiplied by a constant coefficient of less than 1, taking the various corrections into account as appropriate, the filter is considered to be clogged and an alarm is triggered, for example in the form of the display of a light signal.

According to a second aspect the invention provides an installation for ventilation, air conditioning and/or heating of the passenger compartment of a motor vehicle employing the method of the first aspect, the installation including an air filter, air-pumping means including an electric motor driving a rotating aerodynamic component for driving the air, means for measuring a characteristic value of an electric motor driving at least one rotating aerodynamic component for driving the air passing through the said filter in order to obtain a measured value, and means for comparison with a calibration value in order to generate a clogging indication such as an alarm.

The said comparison can be carried out by the computer of the air-conditioning system. The installation may include a means of obtaining the calibration value by measurement of a characteristic value of the electric motor driving at least one rotating aerodynamic component for driving air not passing through the filter, for example recirculated air.

BRIEF DESCRIPTION OF THE DRAWINGS

The invention will be better understood by means of the description below and of the attached FIGURE, given by way of non-limiting example, and which is a diagrammatic view of an embodiment of a system according to the present invention.

DESCRIPTION OF THE PREFERRED EMBODIMENT

Figure 1:
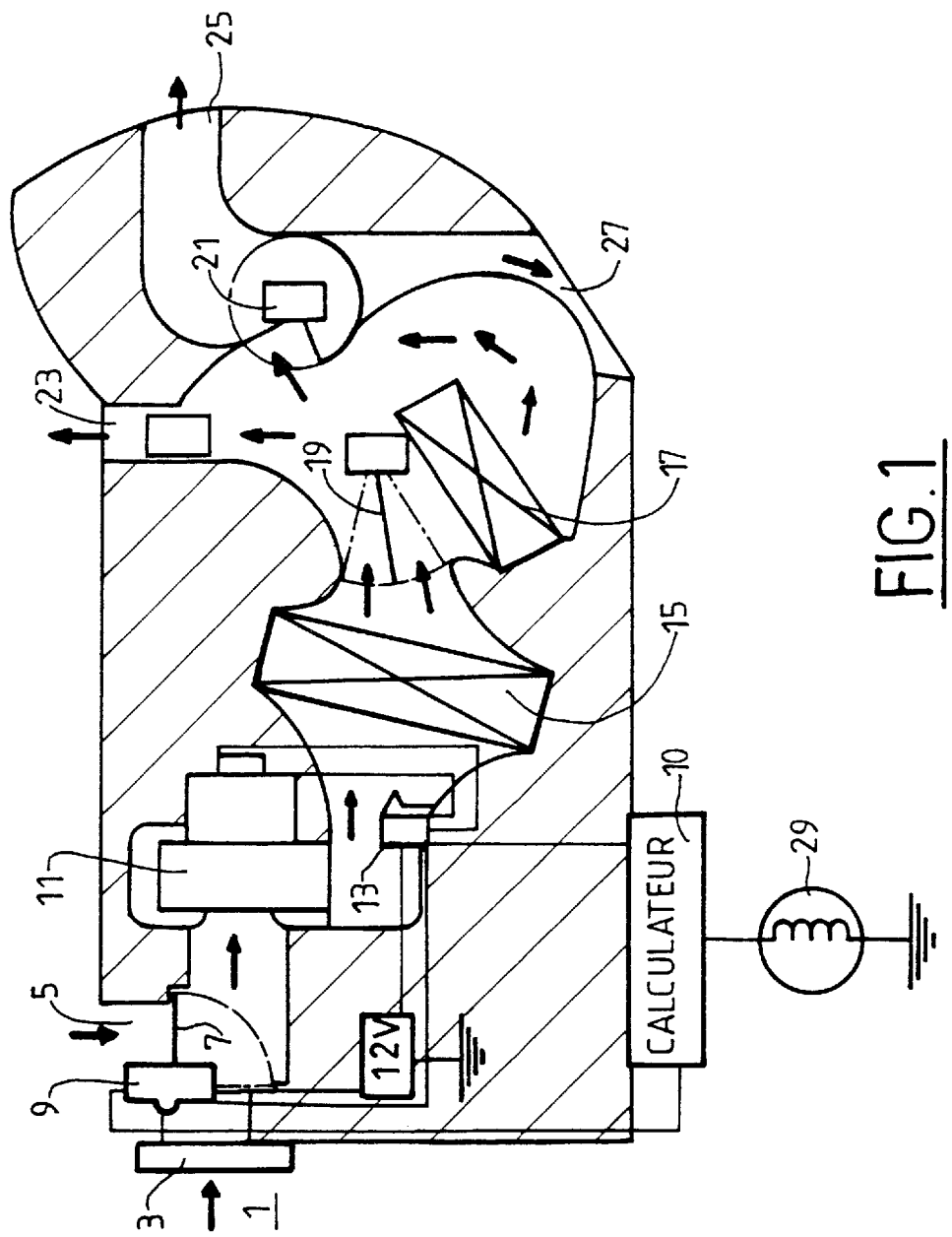

In FIG. 1 can be seen, represented diagrammatically, a system for ventilation, heating and/or air-conditioning of the passenger compartment of a motor vehicle. The ventilation system represented includes an outside-air intake 1 which is filtered by a dust filter 3 and a non-filtered intake 5 allowing ventilation by recirculation of air originating from the passenger compartment. A flap 7, advantageously motorized by a motor 9, makes it possible, under the control of a computer 10, to open the outside-air intake 1 or, in contrast, the intake 5 for the air originating from the passenger compartment. The air is driven by an air-pumping device 11 such as a blower including a propeller, a turbine, vanes or the like, driven by an electric motor controlled by a circuit 13 which is itself controlled by the computer 10. A first heat exchanger 15 and/or a second heat exchanger 17 make it possible to modify the temperature of the air. A flap 19 makes it possible, on demand, to orient or not to orient the air towards the exchanger 17.

A distribution flap 21 allows distribution of air between the various air outlets in the passenger compartment, for example between a first outlet 23 at windscreen level allowing for de-icing/de-misting, a second outlet 25 at the level of the head of the occupants of the passenger compartment, and a third outlet 27 situated in the region of the feet of the occupants of the passenger compartment.

Ventilation systems also exist in which the filter is arranged downstream of the air-intake flap, and in this case the recycled air as well as the outside air is filtered.

The present invention is based on the revelation that the clogging of the filter 3, reducing the flow of air driven by the blower 11, alters the operating conditions of the motor, and, for example, reduces the strength of the electric current drawn by the motor of this blower and its speed of rotation.

Advantageously, a measurement of a reference current is taken. Advantageously, the reference current is measured under the same conditions of blower 11 motor performance, of temperature and of passenger-compartment leaktightness. Advantageously, the measurements are carried out when the passenger compartment is isolated, that is to say when the doors and windows are closed and the vehicle is at rest, that is to say when its speed with respect to the outside air is zero or substantially zero.

The first method of clogging detection can be employed whether the filter is arranged upstream (see FIG. 1) or downstream of the air-intake flap. It consists in comparing the electric current passing through the electric motor for driving the blower with a reference value measured with a new filter. This method is based on the principle that the clogging of the filter generates an additional loss of pressure head on the air circuit of the treated air, which causes a lowering of the electric current which passes through the said motor. The best precision of this measurement is obtained when it is carried out under the same conditions as the reference measurement, that is to say, at identical vehicle speed and with identical air distribution in the vehicle (air blowing all cold, de-icing all hot, etc.), with the same windows open and at the same temperature of the windings of the motor, which depends on the outside temperature, on the operating time of the electric motor and on the torque which it has to overcome. That being so, this method applies rather to a confirmation for maintenance attention by the garage with a vehicle at rest, the electric motor operating for a given time and with a given air distribution.

A second method, which can be used in the case in which the filter is situated upstream of the air-intake flap 7, makes it possible to generate an instantaneous calibration value, independent of the state of clogging of the filter. The calibration value and the measurement value are produced within a very short space of time, which makes it possible to ensure that these two measurements are taken under the same conditions of distribution, of airspeed of the vehicle, of outside temperature and of motor temperature. Moreover, the obtaining of an instantaneous calibration value makes it possible to take into account the aging of the electric motor. The order in which the calibration value and measurement value are obtained is unimportant. According to this second method, a first measurement is taken, for example, the flap 7 ensuring that the intake 5 is closed and the intake 1 is open. In this case, the filter 3 induces no loss of pressure head in the ventilation circuit, which makes it possible to measure a calibration value by measurement of a characteristic value of the motor of the blower 11 such as the strength of the current drawn, for example, for a given power supply voltage, equal for example to 12 volts, a voltage measurement across a resistor placed in series with this motor, the speed of rotation of this motor or the like. The value of the measurement which constitutes a calibration value is stored in memory, by the computer 10 for example.

Under the control of a computer 10, the flap 7 swings so as to close the intake 5 and to open the intake 1. A measurement is taken of a characteristic value, such as the current drawn by the motor of the blower 11 etc., for example, in order to obtain a measurement value.

When the ratio between the measurement value and the calibration value falls below a predetermined threshold, possibly adjustable by the driver, the computer 10 actuates an alarm such as a pilot lamp 29, for example, placed on the instrument panel.

The presence of wind is not troublesome, since it tends to increase the throughput through the aeration apertures and to increase the current drawn by the motor of the blower. In the worst case, a clogged filter will be regarded as serviceable, but it will be detected at the next measurement in the absence of wind, which is not troublesome since the clogging of a filter progresses slowly.

It is possible, for example, in the course of step 6, to calculate a clogging index equal to the ratio of the current drawn by the motor of the blower 11 when the intake 1 is open, divided by the strength of the current flowing in the motor of the blower 11 sucking air into a new filter (first method) or else through the recirculated-air intake (second method). This current strength is a constant for a vehicle and is stored in memory-storage means of the computer 10. The variation in the percentage reduction of the air throughput of a filter with the reduction in the clogging index is an affine function. For a new filter, the clogging index is equal to 1 and the reduction in the throughput is equal to 0, whereas for the reduction in the throughput of 40% with respect to that of a new filter, the clogging index is equal to 0.9.

In the context of the second method, it is possible to be independent of the measurement conditions by calculating a clogging index known as "normalized" index, equal to the ratio Ic=[(current drawn by the motor of the blower in fresh-air position of the current filter)/(current drawn by the motor of the blower 11 in air-recirculation position (current measurement)]/[(current drawn by the motor of the blower in fresh-air position of the new filter)/(current drawn by the motor of the blower 11 in air-recirculation position (factory measurement)].

Advantageously, for one or other of these two methods, the measurement of the clogging of the filter is taken upon start-up after the doors have been closed and before any windows have been opened.

In a variant, the measurement of the clogging is taken by the after-sales department. A measurement according to the first method is particularly suitable for ventilation systems including air-conditioning appliances which are unregulated and/or which lack means 9 for driving the flap 7. The flap can be actuated manually, or a first measurement can be taken in order to obtain a measurement value, the filter being in place and the second measurement can be taken in order to obtain a reference value, the filter being removed or the filter being replaced by a new filter. The characteristic value of the motor of the blower 11 is determined by measurement means incorporated into the vehicle or, advantageously in this case, by separate measurement means.

The present invention is extremely simple to implement and of low cost. The measurement of the current can be made by employing a resistor used to govern the consumption of the motor of the blower. In a variant, a Hall-effect sensor is used, allowing a more accurate measurement but at a higher cost.

For the user, provision is made to display an alarm, for example, a pilot lamp on the instrument panel representing the fact that the clogging of the filter is exceeding a defined threshold.

What is claimed is:

1. A method of measuring clogging of an air filter of a system for ventilation, air conditioning, and/or heating of a passenger compartment of a motor vehicle, the method comprising:

starting up an air-pumping device including an electric motor driving an air-driving rotating aerodynamic component;

measuring a single characteristic value of the electric motor driving at least one rotating aerodynamic component for driving the air passing through the filter the clogging of which is being measured, in order to obtain a single measurement value;

comparing the measurement value with a single calibration value in order to deduce solely therefrom a measure of the clogging of the filter, wherein said calibration value is obtained by measurement of said characteristic value of the electric motor driving a rotating aerodynamic component for driving air passing through a new filter.

2. The method of claim 1, further including a step of displaying a clogging index determined at step c).

3. The method of claim 1, further including a step of displaying an alarm when the clogging of the filter exceeds a predetermined threshold.

4. The method of claim 1, further including a step of obtaining the said calibration value by measurement of a characteristic value of the electric motor driving a rotating aerodynamic component for driving air passing through a new filter.

5. The method of claim 1, further including a step of obtaining the said calibration value by measurement of a characteristic value of the electric motor driving a rotating aerodynamic component for driving air not passing through the filter the clogging of which is being measured.

6. The method of claim 1, wherein the measurement of the characteristic value of the electric motor is a measurement of the strength of the current drawn by this motor.

7. The method of claim 6, including a step of measuring an electrical voltage at the terminals of an electrical resistor connected in series with the motor.

8. The method of claim 1, wherein the measurement of the characteristic value of the motor is a measurement of the speed of rotation of this motor.

9. Installation for ventilation, air conditioning and/or heating of the passenger compartment of a motor vehicle employing the method of claim 1, the installation including an air filter, air-pumping means including an electric motor driving a rotating aerodynamic component for driving the air, means for measuring a characteristic value of an electric motor driving at least one rotating aerodynamic component for driving the air passing through the said filter in order to obtain a measured value, and means for comparison with a calibration value in order to generate a clogging indication such as an alarm.

10. Installation according to claim 9, wherein the air-conditioning system includes a computer, the computer carrying out said comparison of the measured value of the current with the said calibration value.

11. Installation according to claim 9, including a means of obtaining the said calibration value for measurement of a characteristic value of the electric motor driving at least one rotating aerodynamic component for driving the air not passing through the filter.

12. Installation according to claim 11, wherein the air which does not pass through the filter is recirculated air.

13. A method of measuring clogging of an air filter of a ventilation system in a passenger compartment of a motor vehicle, said method comprising the steps of:

running an air pumping device driven by an electric motor to produce air flow through said ventilation system;

determining a calibration value of a single characteristic of said electric motor;

storing said calibration value in a memory of a computer;

measuring a present value of said characteristic of said electric motor;

comparing said present value with said-calibration value; and determining a clogging index based solely upon said step of comparing said present value to said calibration value, wherein said step of determining said calibration value is determined when said filter is known to be unclogged.

14. The method according to claim 13, wherein said step of determining said calibration value is determined when said filter is known to be unclogged.

15. The method according to claim 13, wherein said step of determining said calibration value is determined when said air flow through said filter bypasses said filter and said step of measuring said present value is measured when said air flow through said ventilation system passes through said filter.

16. The method according to claim 13, wherein said characteristic value of said motor is an amount of current drawn by said electric motor.

17. The method according to claim 15, wherein said characteristic value of said motor is an amount of voltage across a resistor connected in series to said electric motor.

18. The method according to claim 15, wherein said characteristic value of said motor is a speed of rotation of said motor.

19. The method according to claim 13, wherein said clogging index is determined by calculating a ratio of said calibration value to said present value of said characteristic of said electric motor.

20. The method according to claim 18, comprising the additional step of:

actuating an alarm when said ratio of said calibration value to said present value falls below a predetermined threshold.

\* \* \* \* \*